United States Patent [19]
Odier

[11] 3,885,651
[45] May 27, 1975

[54] BRAKE ASSEMBLY
[75] Inventor: Jean Odier, Antony, France
[73] Assignee: Societe Anonyme Francaise du Ferodo, Paris, France
[22] Filed: Apr. 30, 1973
[21] Appl. No.: 355,490

[52] U.S. Cl............................. 188/73.5; 188/264 G
[51] Int. Cl............................................. F16d 65/00
[58] Field of Search.......... 188/73.5, 264 G, 205 A, 188/250 B

[56] References Cited
UNITED STATES PATENTS

| | | | |
|---|---|---|---|
| 3,198,294 | 8/1965 | Stacy | 188/250 B |
| 3,275,105 | 9/1966 | Petit | 188/250 B |
| 3,378,116 | 4/1968 | Hennig | 188/250 B |
| 3,490,563 | 1/1970 | Hahm | 188/264 G |
| 3,563,347 | 2/1971 | Hahm | 188/73.1 |

FOREIGN PATENTS OR APPLICATIONS

| | | | |
|---|---|---|---|
| 1,952,568 | 5/1971 | Germany | 188/73.5 |
| 1,270,364 | 4/1972 | United Kingdom | 188/73.5 |

Primary Examiner—George E. A. Halvosa
Attorney, Agent, or Firm—Young & Thompson

[57] ABSTRACT

A brake assembly, comprising a rotatable element, a braking surface on said element, and a pad comprising a friction lining for contact with the braking surface and a rigid support for the lining. The pad is mounted opposite the braking surface, and a brake operating device applies the pad against the braking surface while the braking reaction is transmitted to the mounting structure. Noise-reducing structure is located between the brake operating device and the friction lining and/or between the pad and the mounting structure and comprises a heat-resistant damping element having plastic and elastic properties, i.e., visco-elastic properties similar to these of a butyl rubber, and a covering element adjacent the damping element and having elastic properties similar to those of a metal such as steel. Elastic frequency canalising structure is interposed between the pad and a bearing surface formed on said mounting structure.

9 Claims, 4 Drawing Figures

BRAKE ASSEMBLY

The present invention relates to a brake assembly of the kind comprising a rotatable element having a braking surface thereon, a pad with a friction lining for contact with the braking surface and a rigid support for the lining, means for mounting the pad opposite the braking surface, and a brake operating device for applying the pad against the braking surface, the braking reaction being transmitted to said mounting means.

The invention is particularly applicable to a disc brake in which the rotatable element is a disc and the pad consists of a lined plate.

It has been established that during braking, the brake pad may vibrate, and this can render the brake noisy when the vibrations lie within an audible range. The applicant has established that the pad itself plays a very important part in the excitation of the vibration and that by modifying the frequency response of the pad it is possible to reduce, or even eliminate brake noise.

It is an object of the present invention to provide a brake such as a disc brake, which is quieter than known constructions.

According to the present invention, there is provided a brake assembly comprising a rotatable element, a braking surface on said element, and a pad comprising a friction lining for contact with the braking surface and a rigid support for the lining, means for mounting the pad opposite the braking surface, and a brake operating device for applying the pad against the braking surface while the braking reaction is transmitted to said mounting means, and noise-reducing means located between the brake operating device and the friction lining and/or between the pad and the mounting means and comprising a heat-resistant damping element having plastic and elastic properties, i.e., visco-elastic properties similar to those of a butyl rubber, and a covering element adjacent the damping element and having elastic properties similar to those of a metal such as steel, elastic frequency canalising means being interposed between the pad and a bearing surface formed on said mounting means.

As a result of this arrangement, at the time of braking the damping element, in co-operation with the covering element, is allowed to vibrate, modifying the frequencies and reducing the amplitude of the vibrations which are set up on contact of the friction lining with the braking surface, thus giving considerable reduction in noise.

The material from which the damping element is made preferably has a Young's modulus of which the real part is rather low, of the order of $10^7 N/m^2$, and the imaginary part (interal damping) is rather high in order to dissipate the energy of vibration within the material. The damping element is also of a kind which is resistant to temperatures of the order of 300° or 500°C. Good results have been obtained with a material made from asbestos fibres covered with one or more rubber-like substances.

The covering element is advantageously made of steel or aluminium.

The damping element is preferably integral with the covering element and with the pad.

The elastic canalising means are directed, at the moment of braking, towards canalising the energy of vibration into a relatively narrow range of frequencies.

The elastic canalising means provided are advantageously those having a stiffness of the order of $5 \times 10^6 N/m$ for example which would give this range a value close to the frequency response of the pad so that the damping element is more easily able to eliminate the vibrations in order to reduce noise.

The elastic means may consist, for example, of a corrugated metal blade.

The arrangement according to the invention makes it possible to effect a considerable reduction in the brake noise level, for example a reduction of 30dB and even 50dB. Furthermore the nature of the noise, instead of being unpleasant, becomes very tolerable, being rather a background noise.

The invention also comprehends a brake pad as described, suitable for use with the aforesaid brake assembly.

Embodiments of the invention are described below by way of example only, with reference to the accompanying drawings in which.

Figure 1:
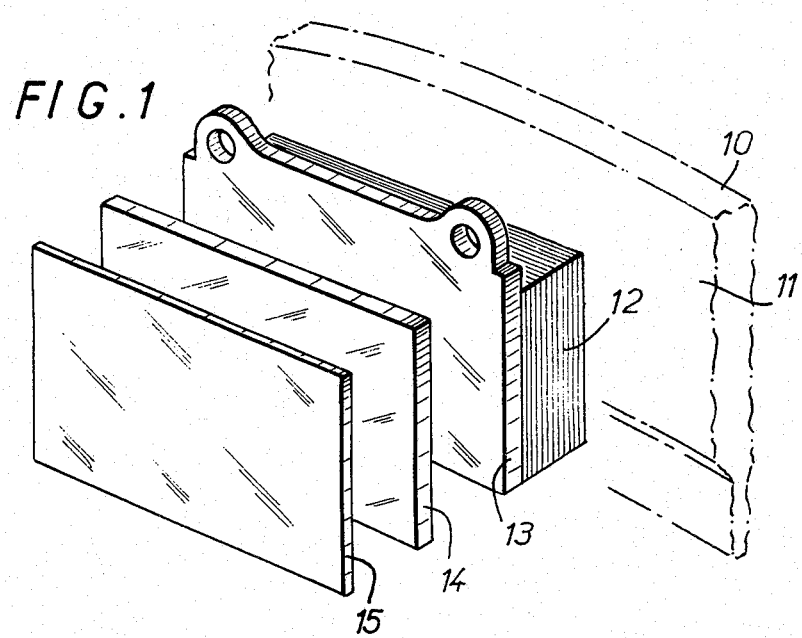
FIG. 1 is a partial diagrammatic view in exploded perspective of a disc brake.
Figure 2:
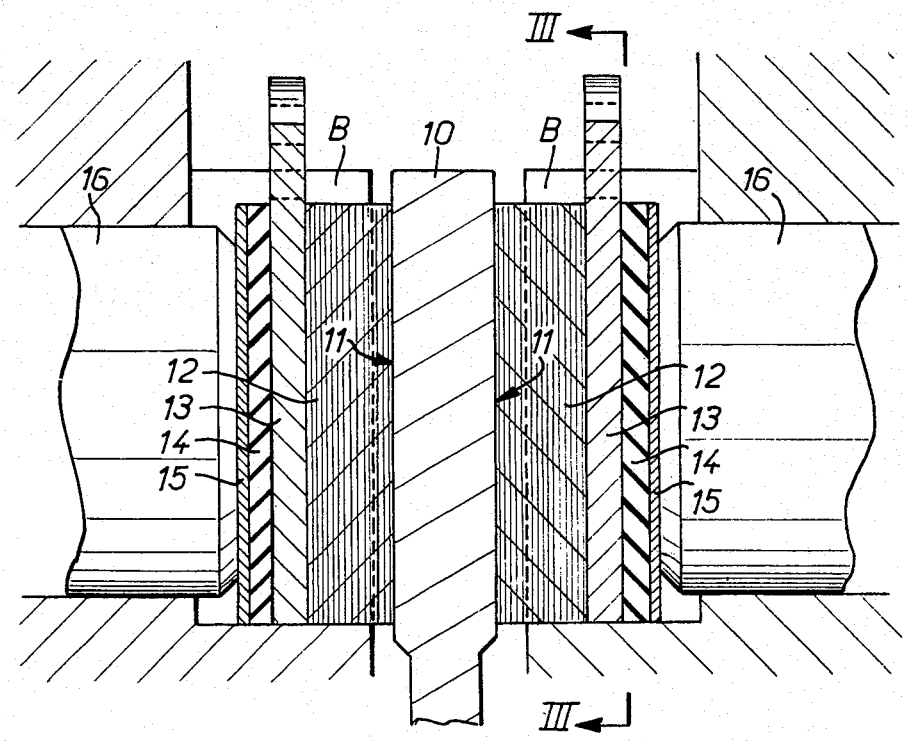
FIG. 2 is a partial diagrammatic view of this brake in section along the line II—II of FIG. 3.
Figure 3:
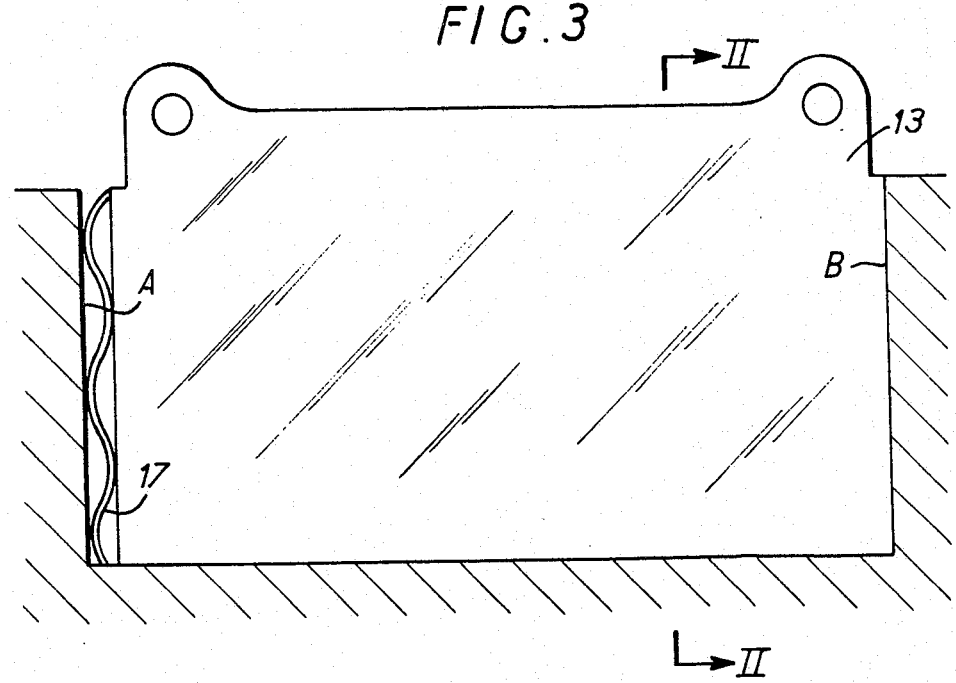
FIG. 3 is a corresponding diagrammatic view, in section along the line III—III of FIG. 2.

In the form of embodiment illustrated in FIGS. 1 to 3 a disc brake for a motor vehicle comprises a rotating disc 10 (FIG. 2) with two opposite braking surfaces 11. Co-operating with each braking surface 11 is a pad which has a friction lining 12 of any suitable material carried by a support in the form of a rigid braking plate 13, of steel for example. In the example shown the two pads and their fittings are symmetrical with respect to the disc 10.

Mounting means are provided to keep each pad 12 and 13 facing its associated braking surface 11 while allowing it to approach the latter and, in the example illustrated in FIGS. 2 and 3, these mounting means comprise a fixed housing which accommodates the pad and which presents lateral bearing surfaces A and B to absorb the braking reaction.

A brake operating device comprising a piston 16 which is subjected to hydraulic pressure is provided for applying the pads against the braking surface, the braking reaction being taken up either by the bearing surface A or by the bearing surface B depending on the direction of rotation of the disc 10.

Noise-reducing means are located between the support 13 and the brake operating device 16 comprising two juxtaposed elements; a damping element 14 having plastic and elastic properties, similar to those of a butyl rubber, and known as visco-elastic properties, while also being heat-resistant, and a covering element 15 having elastic properties similar to those of a metal such as steel.

In the example shown the damping element 14 is adjacent the support 13, while the covering element 15 is a terminal frontal element in steel or aluminium against which the piston 16 is applied.

The various elements 12, 13, 14 and 15 are made integral by adhesion, for example, so as to form a monobloc pad which can be used in precisely the same way as the usual lined plate. This unit 12, 13, 14, 15 can be fabricated in a single operation and is therefor economic to manufacture.

In the example shown, the element 14 is 3 mm thick and the element 15 is 1 mm thick and, for a unit such as this, these dimensions do not entail more than a very slight addition to the axial space requirements in comparison to a normal lined plate.

The material of which the damping element 14 consists is advantageously formed from asbestos fibres covered with one or more rubber-like substances. This material has a Young's modulus of which the real part is rather low, of the order of $10^7 N/m^2$, and of which the imaginary part (internal damping) is rather high, in order to dissipate the energy of vibration in the interior of the material.

This material resists heat well up to 300° to 500°C without losing its properties and it can be glued to the steel support 12 and to the covering element 15 of steel or aluminium with an ordinary adhesive.

Preferably, at least one of the reaction bearing surfaces A and B, for example the bearing surface A, accommodates an elastic means such as a corrugated metal blade 17 (FIG. 3) which allows vibrations to be canalised into a frequency range which is narrower than that of the pad which has, for example, a basic frequency of 1,400 hertz with harmonics at intervals of 800 hertz, this narrower range being absorbed by the noise reducing means. The stiffness of the elastic blade 17 is of the order of $5 \times 10^6 N/m$, for example.

At the moment of braking the pistons 16 advance the pad units so that they are applied against the braking surfaces 11, while the supports 13 transmit the braking reaction laterally to the bearing surface A, with the interposition of the elastic element 17 for example.

Canalisation of frequencies by the blade 17 and their absorption by the noise reducing means results in silent or near-silent braking. For example, whereas a brake like the one shown in FIGS. 2 and 3 but without the elements 14, 15 and 17 has a noise level of 70dB inside the vehicle and 100dB outside the vehicle, the brake according to the invention has a noise level of only 50dB both inside and outside the vehicle and the character of the noise is much more acceptable, being more of a background noise.

The elastic means 17 may consist either of a corrugated blade, as shown, or may take other forms, for example a block of heat-resisting and partly elastic material, such as the material used for the element 14.

Figure 4:
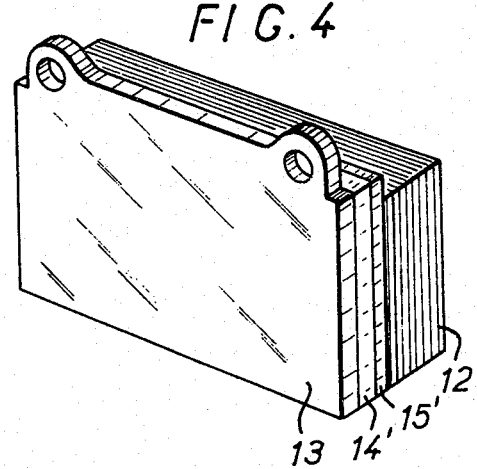
FIG. 4 shows a perspective view of a variant.

Reference will now be made to FIG. 4 in which the arrangement is similar to that described with reference to FIG. 1 but in which the damping element 14' and the covering element 15' are inserted between the support 13 and the lining 12, the element 14' being adjacent and glued to the support 13 while the element 15' is adjacent and glued to the lining 12.

In one variant (not represented) the canalising means and the damping structure and of the same laminated character and surround the plate peripherally.

Instead of fixing the noise reducing means on one or two sides of the support 13 it is also possible to apply the damping element 14 on the bearing surface A or B and to glue on this element 14 the covering element 15 which is then adapted to co-operate with the corresponding side of the support 13.

It will be realised that the elements 14 and 15 and the support 13 may be of exactly the same shape each being cut out in one piece.

It will be understood that the term elastic frequency canalising means is intented to be identical to elastic frequency channeling means.

Having thus described my invention, what I claim as new and desire to secure by Letters Patent of the United States is:

1. A brake assembly comprising a rotatable element having a braking surface thereon, a brake shoe, mounting means for mounting the brake shoe opposite the braking surface, said brake shoe comprising a composite flat platelike sandwich structure including a rigid support plate and a brake lining adapted to be brought into contact with the braking surface and a flat damping element of heat-resistant butyl rubberlike material with visco-elastic properties and a Young's modulus of about $10^7$ N/m$^2$ thereby to damp a predetermined frequency of vibration of the brake shoe and a covering element adjacent to the damping element and having steel-like elastic properties, and resilient means operatively located between a lateral edge of the brake shoe and the mounting means, said resilient means having a stiffness of about $5 \times 10^6$ N/m thereby to channel the frequency range of audible brake shoe vibrations into a narrowed range approaching said predetermined frequency of vibration which the damping element is adapted to damp thereby reducing noise produced by the vibrations.

2. A brake assembly according to claim 1, wherein the damping element is made from asbestos fibers covered with at least one rubberlike substance.

3. A brake assembly according to claim 1, wherein the covering element is made of steel.

4. A brake assembly according to claim 1, wherein the covering element is made of aluminum.

5. A brake assembly according to claim 1, wherein the damping element is located adjacent the support plate.

6. A brake assembly according to claim 5, wherein the damping element is located adjacent to the face of said support plate, opposite the brake lining.

7. A brake assembly according to claim 6, wherein the covering element forms a terminal element of the shoe adapted to cooperate with a brake operating device for the assembly.

8. A brake assembly according to claim 5, wherein the damping element and the covering element are located between the support plate and the brake lining.

9. A brake assembly according to claim 1, wherein the resilient means comprises a corrugated spring.

* * * * *